April 1, 1947.  B. BOGOSLOWSKY  2,418,155
METHOD FOR MAKING PLASTIC ARTICLES
Original Filed Feb. 22, 1944  2 Sheets-Sheet 1
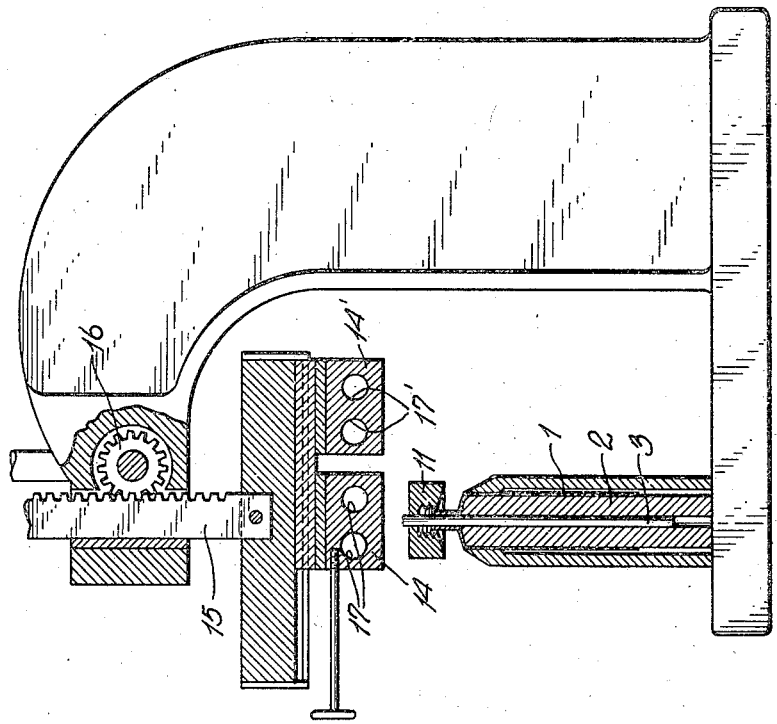
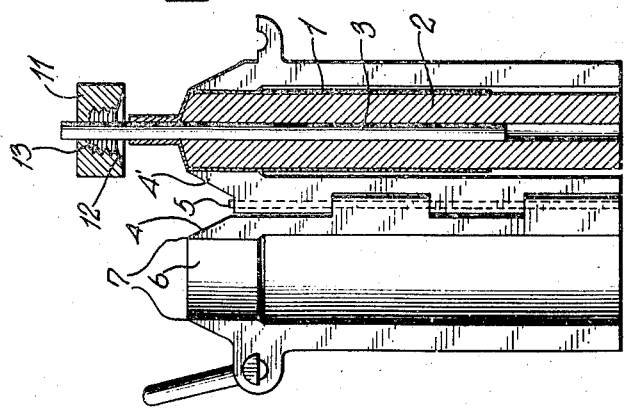
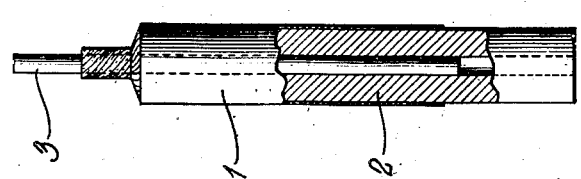
INVENTOR
Boris Bogoslowsky
BY
Emery, Varney, Whittemore & Dix
ATTORNEYS April 1, 1947.  B. BOGOSLOWSKY  2,418,155
METHOD FOR MAKING PLASTIC ARTICLES
Original Filed Feb. 22, 1944   2 Sheets-Sheet 2
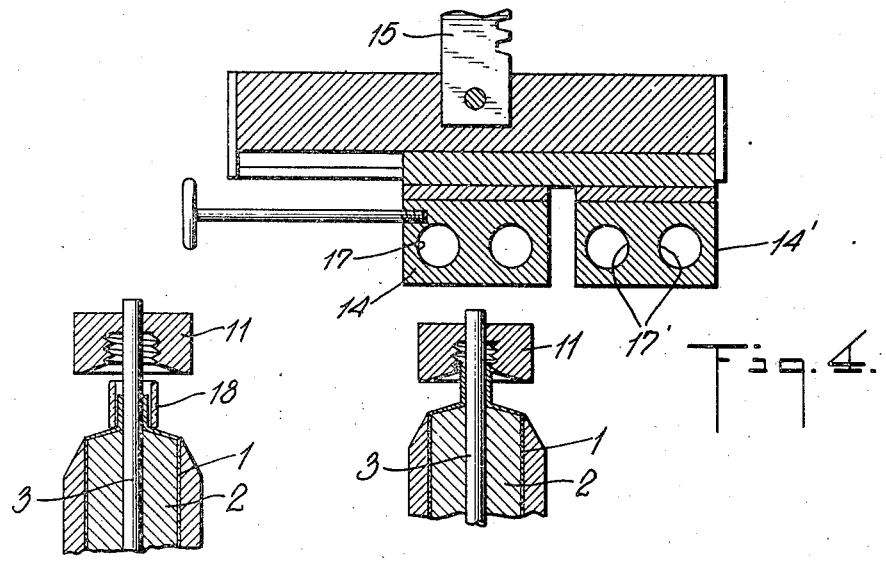
Fig. 4.
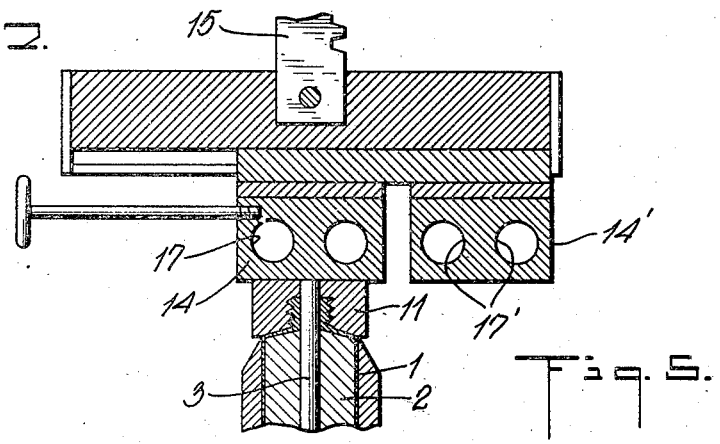
Fig. 2.
Fig. 5.
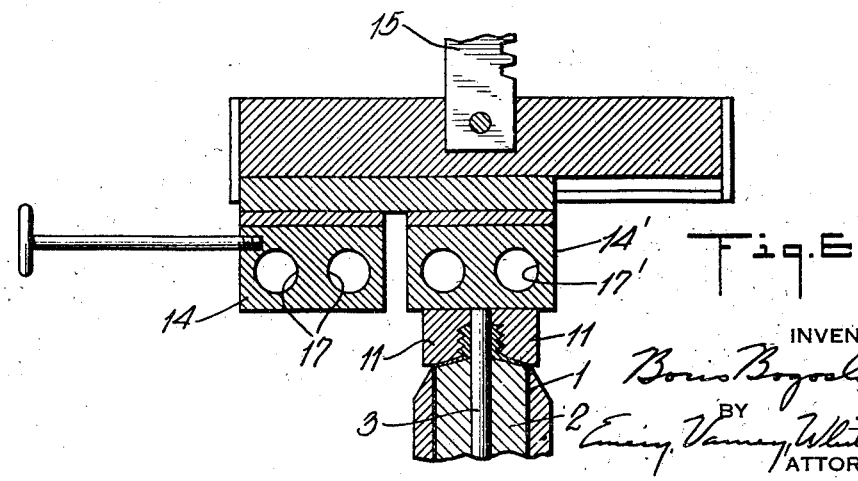
Fig. 6.
INVENTOR
Boris Bogoslowsky
BY
ATTORNEYS Patented Apr. 1, 1947

2,418,155

UNITED STATES PATENT OFFICE 2,418,155

METHOD FOR MAKING PLASTIC ARTICLES

Boris Bogoslowsky, Jackson Heights, N. Y.

Original application February 22, 1944, Serial No. 523,409. Divided and this application February 22, 1944, Serial No. 523,410

3 Claims. (Cl. 18—55)

This invention relates to a method for making plastic articles.

It is an object of the invention to provide a method of making plastic articles from thermoplastic materials, particularly in thin sheet or film form, in which a blank of such material is deformed by folding or otherwise to form a roughly shaped embryo article consisting in part of overlapping plies, and in which such embryo article is brought to final form by sealing or molding the overlapping plies by successive application of heat and pressure and cooling and pressure thereto, while confining the undeformed portion of the blank adjacent the overlapping portions thereof under pressure but without heat.

Other objects and advantages of the invention will appear hereinafter.

A preferred embodiment of the invention selected for purposes of illustration is shown in the accompanying drawings, in which, Figure 1 is a front elevation, partly in section, showing an embryo tube on a supporting mandrel, Figure 2 shows the embryo tube and supporting mandrel (in section) inserted in a mold shell, Figure 3 shows the mold parts in a press in position for the beginning of the molding operation, Figures 4, 5 and 6 are enlarged fragmentary sectional views showing successive stages on the molding operation, and Figure 7 illustrates a modified form.

The invention described herein constitutes a modification of or improvement on the invention described in my copending application Serial No. 523,409 filed of even date herewith, being directed to a method which employs the invention described and claimed therein, with certain adaptations facilitating the application of said invention to additional uses.

The present invention will be described as applied to a specific purpose, namely the making of a collapsible tube from thermoplastic materials or from non-thermoplastic materials laminated or coated with thermoplastic materials, starting with a cylindrical tubular blank of the selected material, either in the form of seamless extruded tubing or in the form of convolute or spiral wound tubing.

According to the present invention, I first deform said tubular blank by folding a portion of the tubular wall thereof to form an embryo collapsible tube having a roughly shaped shoulder and neck integral with and forming a continuation of the tubular wall of the tube. Such deformation of the tubular blank may be accomplished in any suitable manner, as for example by utilizing the methods disclosed in one or the other of my copending applications Serial No. 421,624, filed December 4, 1941, or Serial No. 473,322, filed January 23, 1943, in which a uniform distribution of the folded material is secured. I have illustrated such an embryo tube 1 in Figure 1, said tube being supported on a mandrel 2 having a central spindle 3 as used in the methods disclosed in said applications.

After forming the embryo tube, the tube and its supporting mandrel and spindle are inserted into an outer shell or die member 4, 4', which in the embodiment illustrated consists of two pieces hinged at 5 and having internal cylindrical surfaces 6 adapted to grip the upper portion of the tube wall firmly and hold the same under pressure against the mandrel. Said cylindrical surfaces of the die pieces grip the entire periphery of the upper portion of the tube wall up to the juncture of the tube wall with the shoulder of the tube, and terminate opposite the shoulder in a sharpened edge 7 for purposes hereinafter described.

After the tube is thus gripped by the shell, a die member 11 is placed over the spindle 3, said die member having an internal cavity 12 adapted to cooperate with the mandrel, spindle and shell to mold the shoulder and neck of the tube. As illustrated, the neck portion of the cavity is provided with an internal thread 13 adapted to form an external thread on the neck of the tube.

After the die member 11 is in place, heat and pressure are applied through a pressure head 14 having any suitable means for moving the same toward the mandrel and having any suitable means for heating the same. For example, as illustrated, the head may be moved by the rack 15 and pinion 16 and may be heated by electrical heating cartridges inserted in the passages 17. After sufficient time has elapsed to soften the thermoplastic material sufficiently, the heating cartridges may be withdrawn from the passages without relaxing the pressure applied and cooling shells connected to a supply of cold water may be inserted in the passages to cool the die and tube while maintaining the pressure.

Alternatively, after applying heat as above described, the head 14 may be lifted by the rack and pinion and the cooling head 14' is shifted into the place of head 14. Then the head 14 is immediately lowered to apply pressure to the material while the cooling operation continues. The cooling head is provided with passages 17' adapted to receive cooling shells connected to a supply of cold water.

In order to provide a molded shoulder and neck of substantial strength and rigidity and smooth external surface, the volume of material in the shoulder and neck of the embryo tube should slightly exceed the volumetric capacity of the mold spaces in which the shoulder and neck are located so that when heat and pressure are applied as described, the material of the shoulder and neck will be compressed. The slight excess of thermoplastic material will be allowed to escape between the bottom surface of the die 11 and the edge 7 of the shell 4 just before these come together as the mold is closed, and as the mold is closed such excess is trimmed off by the edge 7, producing a shoulder having a periphery which is smooth and clean.

At the same time, it will be understood that the shell 4 remains cool during the application of heat to the die 11 since no heat is applied directly thereto, and the amount of heat transmitted through the sharp edge 7 during its relatively brief contact with the die 11 is small and wholly insufficient to affect the material confined between the shell and mandrel. The mandrel is preferably made of material of low heat conductivity, as for example wood, Bakelite, glass, porcelain or the like.

In some cases, as where working with tubular blanks made of non-thermoplastic material having only a thin coating or lamination of thermoplastic material, it may be advisable to add additional thermoplastic material before closing the mold. In such cases the additional material may be inserted in any suitable form, as for example the collar 18 shown in Figure 7.

As soon as the material is cooled sufficiently the pressure head may be lifted and the die 11 may be removed from the tube. Then the finished tube may be removed from the shell, and the mandrel and spindle may be withdrawn.

It will be understood that the invention may be variously modified and embodied within the scope of the subjoined claims.

I claim as my invention:

1. The method of making a plastic article which comprises deforming a portion of a blank containing thermoplastic material to form an embryo article in which the deformed portion consists of overlapping plies of such material, confining the undeformed portion of said blank adjacent the overlapping plies between mold surfaces and applying pressure without heat through said mold surfaces to the portion of the blank confined therebetween, and successively applying heat and pressure and cooling and pressure to the overlapping plies through mold surfaces which adjoin said first named mold surfaces, while continuing to apply pressure without heat to the confined portion of the blank.

2. The method of making a collapsible tube which comprises deforming one end of a cylindrical tubular blank containing thermoplastic material to form an embryo tube having an integral shoulder and neck consisting of overlapping plies of such material, confining the undeformed portion of said blank adjacent said shoulder between internal and external mold surfaces and applying pressure without heat through said mold surfaces to the portion of the blank confined therebetween, and successively applying heat and pressure and cooling and pressure to the overlapping plies of the shoulder and neck through mold surfaces which adjoin said internal and external mold surfaces, while continuing to apply pressure without heat to the confined portion of the blank.

3. The method of making a collapsible tube which comprises deforming one end of a cylindrical tubular blank containing thermoplastic material to form an embryo tube having a shoulder and neck consisting of overlapping plies of such material, said shoulder extending inwardly from the wall of said blank and said neck extending upwardly from said shoulder, supporting said embryo tube internally on a mandrel, placing said embryo tube while so supported in an external die comprising two parts, one of said parts having an internal cavity adapted to mold the overlapping plies of the shoulder and neck, and the other of said parts having a cylindrical mold surface adapted to confine and grip the wall of the blank below said shoulder and hold the same under pressure against said mandrel, applying pressure without heat through said second part to the portion of the blank confined thereby, and successively applying heat and pressure and cooling and pressure to the overlapping plies of the shoulder and neck through said first mold part while continuing to apply pressure without heat through said second part to the portion of the blank confined thereby.

BORIS BOGOSLOWSKY.

REFERENCES CITED

The following references are of record in the file of this patent:

UNITED STATES PATENTS

| Number | Name | Date |
|---|---|---|
| 2,320,583 | Forro | Jan. 13, 1934 |
| 2,313,031 | Parkhurst | Mar. 2, 1943 |
| 1,980,566 | Wright | Nov. 13, 1934 |
| 1,966,877 | Witte | July 17, 1934 |
| 1,754,496 | Barker | Apr. 15, 1930 |
| 2,176,109 | Ratay | Oct. 17, 1939 |

FOREIGN PATENTS

| Number | Country | Date |
|---|---|---|
| 761,834 | French | Jan. 13, 1934 |